G. W. Kintz,
Animal Trap.
No. 87,945.      Patented Mar. 10, 1869.

Witnesses
L. F. Osgood
Geo. W. Miatt

Inventor
Geo. W. Kintz
By J. Fraser & Co.
Attys.

GEORGE W. KINTZ, OF ROCHESTER, NEW YORK.

Letters Patent No. 87,945, dated March 16, 1869.

---

IMPROVED ANIMAL-TRAP.

---

The Schedule referred to in these Letters Patent and making part of the same.

---

*To all whom it may concern:*

Be it known that I, GEORGE W. KINTZ, of the city of Rochester, county of Monroe, and State of New York, have invented certain new and useful Improvements in Vermin-Traps; and I do hereby declare that the following is a full and exact description thereof, reference being had to the accompanying drawings, making part of this specification, in which—

Figure 1:
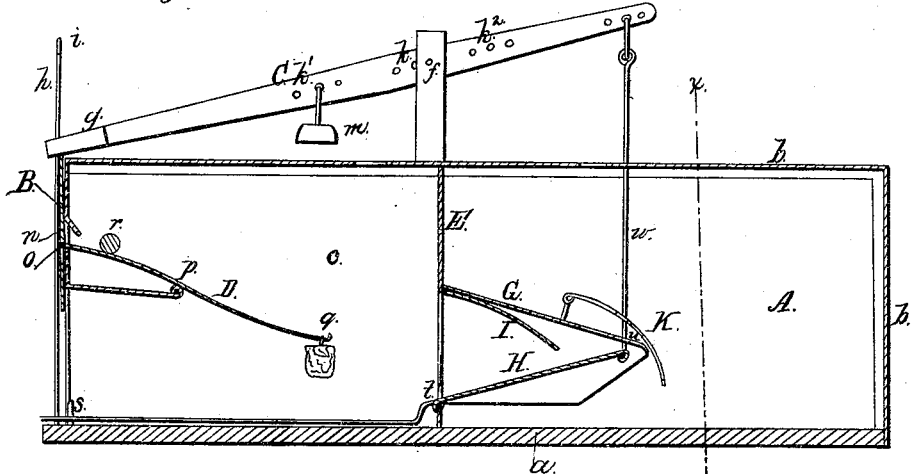

Figure 1 is a central vertical section of my improved trap.

Figure 2:
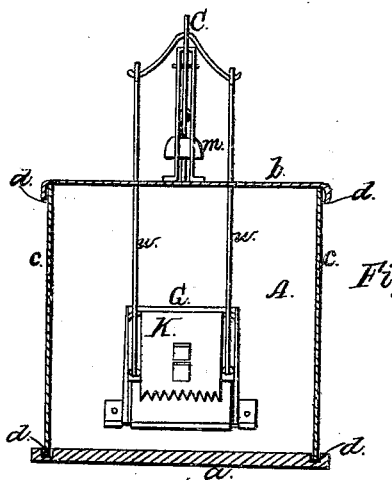

Figure 2, a cross-section, in plane $x\ x$, fig. 1.

Figure 3:
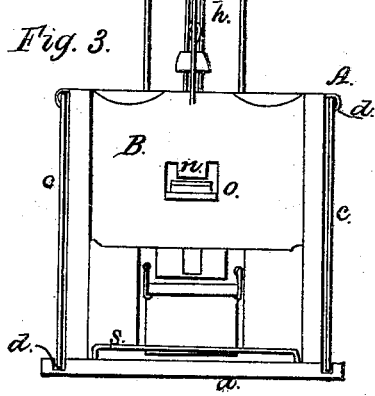

Figure 3, a front elevation.

Figure 4:
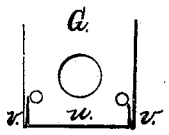

Figure 4, a detail view.

Like letters of reference indicate corresponding parts in all the figures.

This invention consists in a guard, so arranged that the door of the trap cannot be raised from within by the captured animal.

It further consists in placing a platform and spring within the leader, and a flap on the outside thereof, so as to insure the resetting of the trap, and preventing the return of the animal after he has once entered the leader, as will be hereinafter described.

In the drawings—

A represents the box, composed of a base, $a$, of wood, a top and back-piece, $b$, of tin, bent to the proper form, and two glass sides, $c\ c$, which slide in and out at pleasure, in grooves, $d\ d$, at top and bottom. This completes the box, with the exception of the entrance-end, which is left open for the insertion of a door, as will presently be described.

In the open end of the box is fitted a door, B, which slides up and down through the medium of the adjusting-lever C, which is pivoted at $f$, and has an open eye, $g$, that slides over stem $h$ of the door, the stem having a cross-head or stop, $i$, at the top, to prevent the eye sliding off. Thus, when the door is raised, the lever can fall, leaving it elevated, as shown in fig. 1.

The lever is made adjustable in position by means of holes, $k$, as shown.

It is also provided with holes, $k^1$ and $k^2$, on opposite sides of the fulcrum, for the attachment of a weight, $m$, to vary the adjustment of the lever, either to adapt the trap for catching animals of different sizes, or for other objects.

In the door is cut a tongue, $n$, which is capable of being bent in or out at pleasure; said tongue resting upon and engaging with the bearing $o$, of trencher D, which is pivoted at $p$, and holds the bait at $q$.

A counterbalance-weight, $r$, is employed upon bearing $o$, to preserve its position.

When the bait is depressed, it will be seen that the bearing $o$ will be drawn out from under tongue $n$, thus allowing the door to fall, and imprisoning the animal. The door will be raised again by the upward action of the lever, as will presently be described.

It will be noticed, that by bending the tongue $n$ more or less in, it will be made to hold more or less upon the bearing $o$. This feature is one of the special points of novelty in my invention.

Just inside the door, at the bottom, is situated a wire guard, $s$, the object of which is to prevent the animal from raising the door by rooting under the bottom. Any power he may apply at that point will be expended on the guard, and not upon the door. This also forms a special feature of novelty in my case.

Across the box is made a division, E, and a leader or tube, G, is made to extend from this into the chamber in the rear, furnishing the only passage for the animal when caught.

In entering this leader, he steps upon a platform, H, hinged at $t$.

To the opposite end of the platform is or are connected a rod or rods, $w$, which extend up and connect with lever C.

The animal, in passing through, depresses the platform, and therefore elevates the door B, through the medium of lever C. When elevated to a suitable height, the bearing $o$ falls under the tongue $n$, as before described, and the trap is set again, while the animal passes on through the leader. In his passage through, he is prevented from retreating by a spring, I, which projects downward therein, part way across the passage.

The roof $u$ of the leader, at the extremity, is slitted in at the edges, as shown at $v\ v$, fig. 4, by which means said roof may be bent downward to any degree desired, to contract the exit-passage, thereby adapting the leader to animals of different sizes, without danger of their backing out. It also insures the resetting of the trap, by making the animal press sufficiently upon the loose end of platform H, to operate properly upon lever C. This is one of the novel features in my invention.

On the end of the leader is also hinged a flap, K, with the loose end cut into saw-points, and shutting down over the exit-passage. This operates in connection with platform H and spring I, to prevent the possibility of a return of the animal, for the flap turns down, the platform turns up, and the spring stands across the passage.

I am aware that various forms of self-setting traps have been before known, in which the animal, in passing from one chamber to another, resets the trap. I do not claim the broad principle.

The distinctive features in my case are the flexible tongue $n$, capable of being bent to hold more or less upon the bearing $o$; the arrangement of the platform H, bonnet-flap K, and spring I, for preventing the escape back of the animal; the flexible roof $u$, for closing more or less of the exit-passage; the guard $s$, to prevent the accidental raising of the door; the arrangement, with the door B and platform H, of the adjusting-lever C and stem $h$; and the construction of the box with the removable glass sides. These features I believe to be new and original with myself.

What I claim as my invention, and desire to secure by Letters Patent, is—

1. The arrangement, within the leader G, of the platform H and stop-spring I, in combination with the hinged flap K, on the outside thereof, substantially as and for the purpose described.

2. The combination of the guard $s$ with the door B, for preventing the accidental raising of the door, as set forth.

In witness whereof, I have hereunto signed my name, in the presence of two subscribing witnesses.

GEO. W. KINTZ.

Witnesses:
 R. F. OSGOOD,
 GEO. W. MIATT.